United States Patent [19]
VanBuskirk

[11] Patent Number: 5,141,588
[45] Date of Patent: Aug. 25, 1992

[54] LATERALLY STABILIZED INFLATABLE BEAD TURN-UP BLADDER FOR TIRE BUILDING DRUM

[75] Inventor: William J. VanBuskirk, Akron, Ohio

[73] Assignee: Bridgestone/Firestone, Inc., Akron, Ohio

[21] Appl. No.: 633,737

[22] Filed: Dec. 24, 1990

[51] Int. Cl.⁵ .............................................. B29D 30/26
[52] U.S. Cl. ..................................... 156/401; 156/414
[58] Field of Search ................. 156/401, 414, 415, 417

[56] References Cited

U.S. PATENT DOCUMENTS

| | | | |
|---|---|---|---|
| 3,101,289 | 8/1963 | Giletta et al. | 156/133 |
| 3,418,192 | 12/1968 | Nadler | 156/401 |
| 3,989,564 | 11/1976 | Touchette et al. | 156/118 |
| 4,081,310 | 3/1978 | Shichman et al. | 156/398 |
| 4,226,656 | 10/1980 | Appleby et al. | 156/401 X |
| 4,239,579 | 12/1980 | Felten et al. | 156/401 X |
| 4,450,025 | 5/1984 | Henley | 156/132 |
| 4,498,948 | 2/1985 | Brown et al. | 156/401 |
| 4,830,693 | 5/1989 | Okafuji et al. | 156/132 |

Primary Examiner—Michael W. Ball
Assistant Examiner—Francis J. Lorin
Attorney, Agent, or Firm—Ernst H. Ruf

[57] ABSTRACT

An improved inflatable bead turn-up bladder for a tire building drum which reduces or elminates cord length variation in a reinforced tire carcass by stabilizing the bladder in the area utilized for lifting the reinforced cord fabric into contact with the tire bead on the tire building drum. The elastomeric inflatable bladder is formed with an integral annular rib which is seated in complementary shaped grooves or slots formed in the radially movable segments of the tire drum bead locks. When the bead lock segments are actuated, the adjacent portion of the bladder and overlying tire carcass is prevented from axial movement by the engagement of the bladder rib in the bead lock segment groove. A stretch zone is provided in the bladder between the rib and one end of the bladder by eliminating reinforcing material from that area of the bladder.

4 Claims, 4 Drawing Sheets

LATERALLY STABILIZED INFLATABLE BEAD TURN-UP BLADDER FOR TIRE BUILDING DRUM

BACKGROUND OF THE INVENTION

1. Technical Field

The invention relates to tire building equipment and in particular to the tire building drum and inflatable turn-up bladder associated therewith. More particularly, the invention relates to an improved inflatable bladder which reduces or eliminates cord length variation of the tire carcass on the drum by stabilizing the bladder in the area utilized for lifting the reinforced cord fabric of the tire carcass to the tire bead on the tire building drum.

2. Background Information

In the building of pneumatic tires, the various sheets or strip components thereof are laid and placed around a cylindrical drum to build up the carcass. Generally these sheets consist of an innerliner, reinforcement strips of calendered fabric, steel, fiberglass or the like, sidewall strips, etc. One of the steps in the tire manufacturing process is the coaxial telescopic mounting of a bead ring over the drum around which the ends of the tire carcass are turned up in forming the usual toroidal shape of the final tire. These carcass ends are generally turned up by inflatable bladders which are sleeve-like, the ends of which are sealingly mounted on the drum with the intermediate area being inflatable by air for rolling up the ends of the tire carcass around the bead rings. Prior to the inflation of the turn-up bladders, the carcass is moved radially outwardly into engagement with the telescopically located bead rings by a plurality of circularly arranged bead lock segments which are mounted on the drum and are expanded radially outwardly by pressurized air, mechanical linkages or the like.

However, when the bead locks are actuated, there is a lateral displacement of the bladders due to the bead lock expansion which results in an axial shift of the carcass ply material, and in particular an axial shift of the reinforcing fabric or cord thereof at variable rates around the circumference of the drum, thereby producing cord length variations. These cord length variations in the final tire may produce undesirable characteristics, particular in the smoothness of the ride provided by the tire.

Therefore, the need has existed for an improved inflatable bladder for a tire building drum which will turn-up the ends of the tire carcass around the bead after locking the bead in place, without producing cord length variations due to the heretofore lateral or axial movement of the inflatable bladder and tire carcass laid thereon. Various tire building equipment, using inflatable bladders have been developed, none of which are believed to overcome the lateral movement problem of the bladder and reinforcing portion of the tire carcass as does the present invention.

The most pertinent known prior art to the present invention is set forth in the following patents:

U.S. Pat. No. 3,101,289 discloses a method of making a resilient reinforced diaphragm for use on a tire building drum wherein the diaphragm has lateral zones and a central zone, with the central zone having reinforcing material embedded therein. Upon expansion of a pair of rings, the bead wires are pressed into grooves formed in the rings with the reinforcing material in the central zone, being used to provide radial stability to the diaphragm.

U.S. Pat. No. 3,418,192 shows the use of a bellows secured to the drum at the enlarged bead portions thereof in a tire building drum.

U.S. Pat. No. 3,989,564 discloses a method and apparatus for forming a tire using a building drum that employs an inflatable bladder wherein the expandable sleeve thereof has an inflatable portion that is formed from a rubber material without cord reinforcement and is retained in a slot by an integral flange. This is a type of construction utilized for many tire building drums for holding the sleeve on the center of the drum when radially expanding the drum.

U.S. Pat. No. 4,081,310 discloses an expandable bead grip wherein one bead end portion of the bladder is retained in a groove formed in the expandable bead ring.

U.S. Pat. No. 4,830,693 shows another inflatable bladder used in a tire building drum which has reinforcing material embedded in a portion thereof.

U.S. Pat. No. 4,450,025 discloses a method and apparatus for encasing a tire bead wherein an inflatable bladder is positioned over drum segments via a plurality of projections spaced at intervals around a circumference of the drum with projections fitting into grooves. Even though the projections prevent axial movement of the bladder, it does not solve the same problem as that solved by the present invention, that is, cord length fabric variations upon outward expansion of the bead lock segments. In this prior art patent, the bead cover strip does not move laterally and the projections are only spaced at intervals around the circumference of the drum.

Although the known prior art discloses various inflatable bladders and expandable bead lock segments, none of these provide a construction which solves the problem of cord length variation upon the outward expansion of the bead lock segments due to the lateral displacement of the bladder and supported tire carcass.

SUMMARY OF THE INVENTION

Objectives of the invention include providing an improved tire building drum and inflatable bead turn-up bladders which reduce or eliminate cord length variation in the reinforcing fabric of the tire carcass by stabilizing the turn-up bladder which lifts the reinforced cord fabric to the tire bead when the latter is telescopically mounted on the tire building drum.

A further objective of the invention is to provide such an inflatable bladder wherein the ends thereof are attached to the drum in the usual manner but is provided with an additional integrally formed annular rib which is seated into grooves or slots formed in the bead lock segments, preventing lateral displacement of the bladder and supported carcass ply material, as the bead locks are expanded radially outwardly into the bead ring.

Still another objective is to provide such an improved inflatable bladder having a stretch zone free of internal reinforcing material which is located between the retaining rib and one end of the bladder, to permit the bladder to stretch in this area while stabilizing the bladder area and supported carcass above the bead lock segments to prevent the undesirable axial movement and resulting variations in the reinforcing fabric.

Still another objective of the invention is to provide such an improved inflatable bladder in which the retaining rib may be formed either on the inner or outer surfaces of the turn-up bladder at various locations between the bladder ends, enabling the bladder to be utilized with various configured tire building drums without affecting the manner of operation and construction of the drums except for the replacement of the heretofore used bead lock segments with new segments having a groove formed therein.

A further objective of the invention is to provide such an improved inflatable bead turn-up bladder in which the stabilizing rib is preferably formed integrally with the bladder and of the same elastomeric material, thereby enabling the production of the bladder to be achieved in a usual low cost manufacturing operation.

A still further objective of the invention is to provide an inflatable bladder which eliminates the floating of the bladder over the bead locks as the locks are expanded radially outwardly by securing the bladder to the bead locks, preventing movement of the tire carcass therewith; and in which certain areas of the bladder are reinforced so as not to allow any stretch in the critical areas of the bladder while allowing the bladder material from the securement rib to the inboard end of the bladder to stretch as the bead lock segments are expanded outwardly.

These objectives and advantages of the invention are obtained by the improved inflatable elastomeric bead turn-up bladder in combination with a tire building drum of the type having a plurality of radially movable segments circularly arranged coaxial of the drum for gripping a bead against the tire carcass, in which the inflatable bead turn-up elastomeric bladder is disposed coaxially of the drum and extends generally axially outwardly with respect to a centerline of the drum, with a portion of the bladder coaxially overlying the movable segments. Furthermore, the segments are formed with slots or recesses which provide an annular groove about the circularly arranged bead lock segments. The bladder includes a pair of circular ends sealingly secured on the drum to form an inflatable chamber therebetween, with the bladder having rib means attached in the annular groove of the bead lock segments for reducing axial movement of that portion of the bladder lying coaxially adjacent the segments upon radial outward movement of the segments, with the bladder having a stretch zone free of internal reinforcement between the rib means and one of the bladder ends.

BRIEF DESCRIPTION OF THE DRAWINGS

A preferred embodiment of the invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
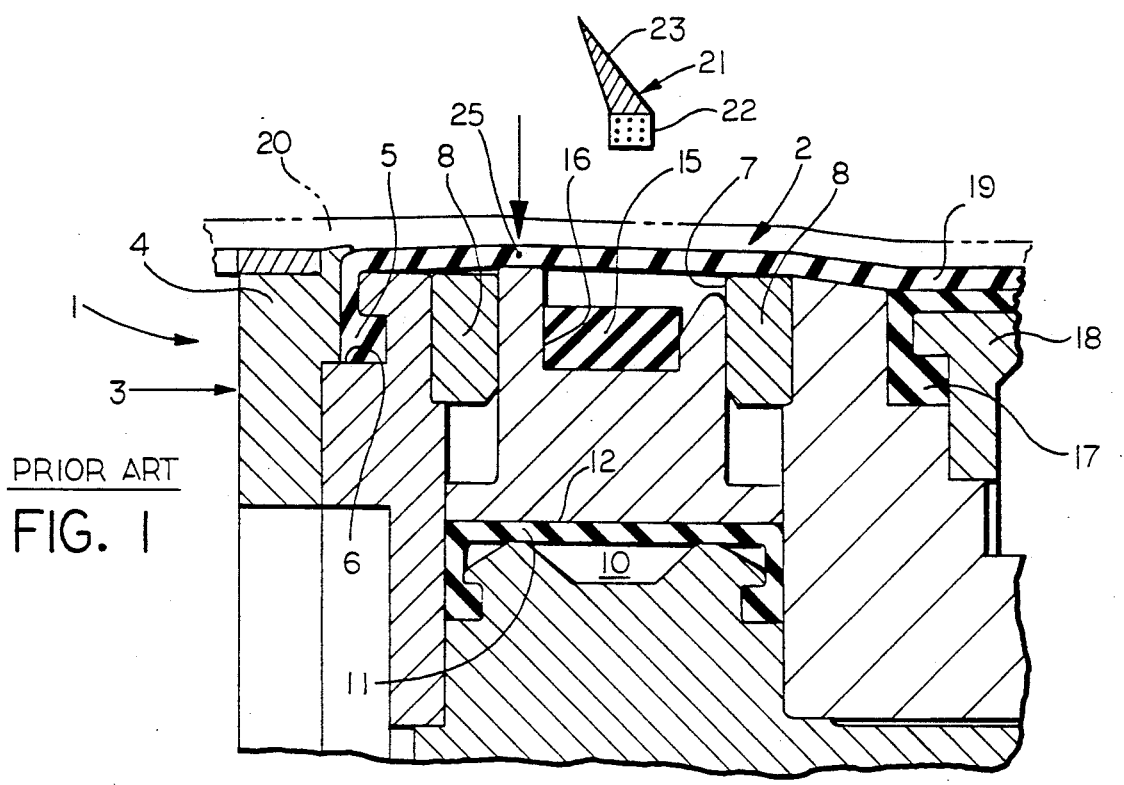
FIG. 1 is a fragmentary diagrammatic view in partial section, showing a prior art turn up bladder mounted on a tire building drum, with the bead lock segments being in a retracted position and the bladder in an uninflated position prior to engagement with a bead ring shown mounted coaxially thereabout.
Figure 2:
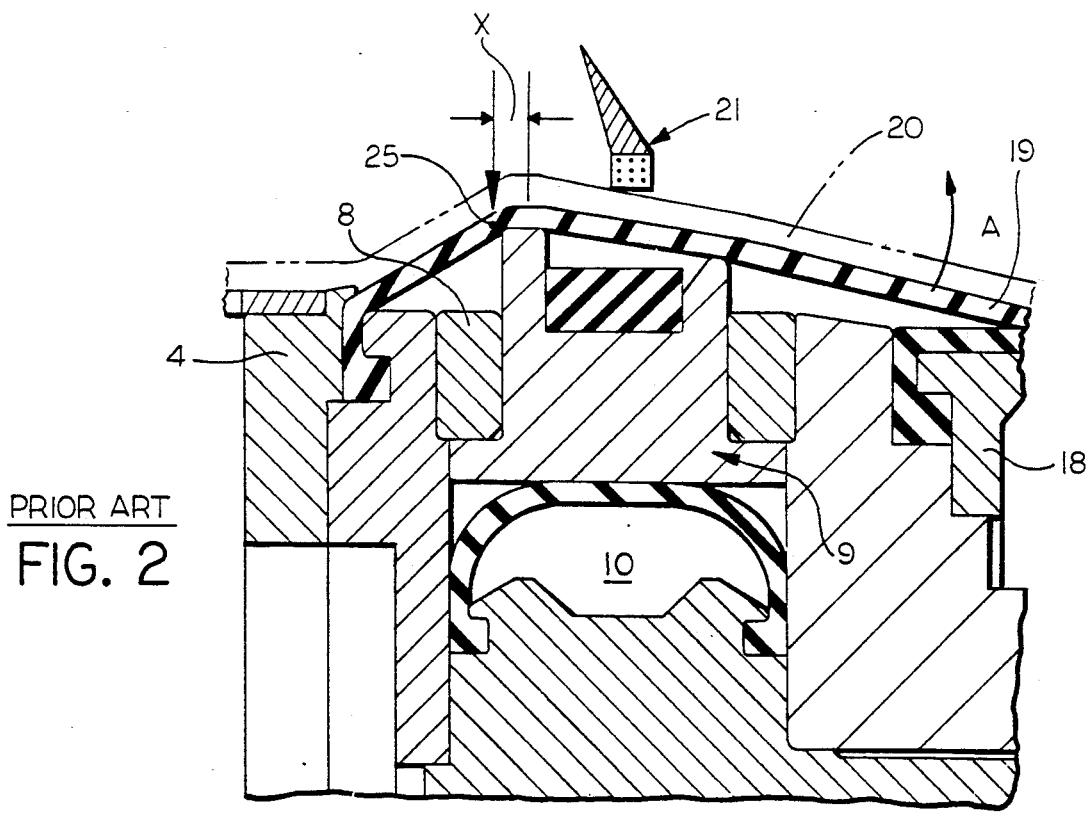
FIG. 2 is a view similar to FIG. 1 showing the axial shift which occurs in the bladder and tire carcass ply material after expansion of the bead lock segments toward the bead ring and prior to inflation of the bladder.

FIGS. 1 and 2 show a prior art tire building drum and associated inflatable bead turn-up bladder mounted thereon. Tire building drum 1 is of a usual construction and includes a main drum body 3 having a collar plate 4 which locks a first ribbed end 5 of usual inflatable bead turn-up bladder 2, within a groove 6 thereof, in an air tight sealing relationship. A pair of stop rings 8 are mounted on drum body 3 in an axial spaced relationship forming a channel 7 therebetween. A plurality of bead lock segments, indicated generally at 9, are radially slidably mounted in channel 7.

In the particular tire drum configuration shown in FIGS. 1 and 2, bead lock segments 9 are moved radially outwardly by pressurized air filling a chamber 10, in combination with an inflatable elastomeric chamber 11 which engages bottom surface 12 of each segment 9. An annular elastomeric band 15 is located within a complementary shaped channel 16 formed in each segment 9, providing a return spring for the segments. Bladder 2 has a second ribbed end 17 which is locked in an airtight sealing position on drum body 3 by another collar plate 18. The remaining elastomeric material portion 19 of bladder 2 extends between bladder ends 5 and 17 forming an elastomeric sleeve-like member which provides an inflation chamber which when filled with compressed air, will cause material portion 19 to expand upwardly outwardly in the general direction of arrow A, in a somewhat similar manner as shown in U.S. Pat. No. 3,989,564, for moving the ends of the tire carcass, indicated in phantom lines at 20, around a bead ring 21 which is located coaxially over the carcass end and radially aligned with the center of bead lock segments 9. Bead rings 21 may have a variety of configurations and usually consists of a wire ring 22 generally encased within an elastomeric material, together with bead apex strip 23 extending outwardly therefrom.

The particular construction of tire drum 1, turn-up bladder 2 and drum body 3, is well known in the art as shown in FIGS. 1 and 2, and illustrates the problem that occurs in such tire building equipment, which is solved by the present invention.

FIG. 1 shows bladder 2 in a deflated position and bead lock segments 9 in retracted position, with a tire carcass 20 overlying the bead locks prior to the bead lock segments 9 being expanded radially outwardly as shown in FIG. 2, so as to bring the tire carcass and bladder into engagement with coaxially mounted bead ring 21. The undesirable lateral shifting of the bladder is illustrated by means of a point 25 on bladder 2, which when at rest in FIG. 1 is positioned above one particular location of bead segment 9. However, when the bead lock segments are expanded radially outwardly point 25 shifts toward the left or towards the centerline of the tire building drum a distance "X", due to the bladder material 19 floating over the bead lock segments as the segments move radially outwardly toward engagement with bead ring 21. This lateral axial movement although relatively small, will also move with it, in a variable manner, tire carcass 20, and in particular the reinforcing fabric (not shown) located therein, in a nonuniform pattern around the circumference of the tire carcass. It is this irregular movement of the tire reinforcing fabric within the tire carcass which may cause undesirable ride characteristics in the finished tire.

Figure 3:
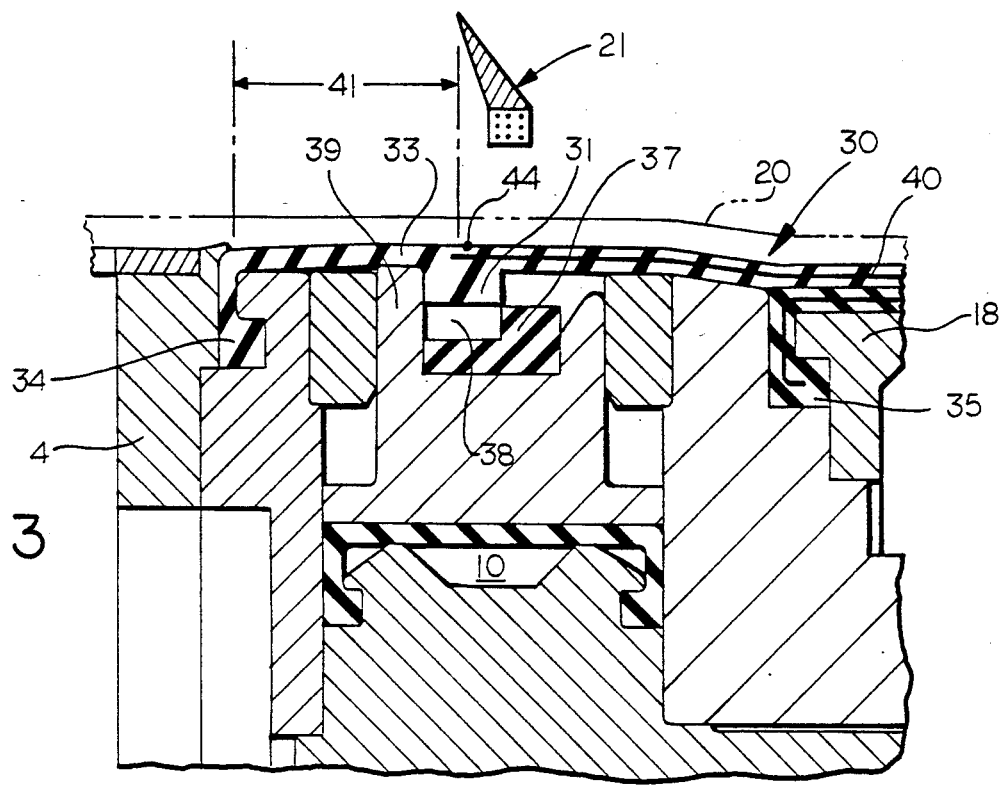
FIG. 3 is a view generally similar to that of FIGS. 1 and 2 but having the improved laterally stabilized bladder of the invention in a secured position on the bead lock segments of the building drum, with the bead lock segments being shown in retracted position.
Figure 4:
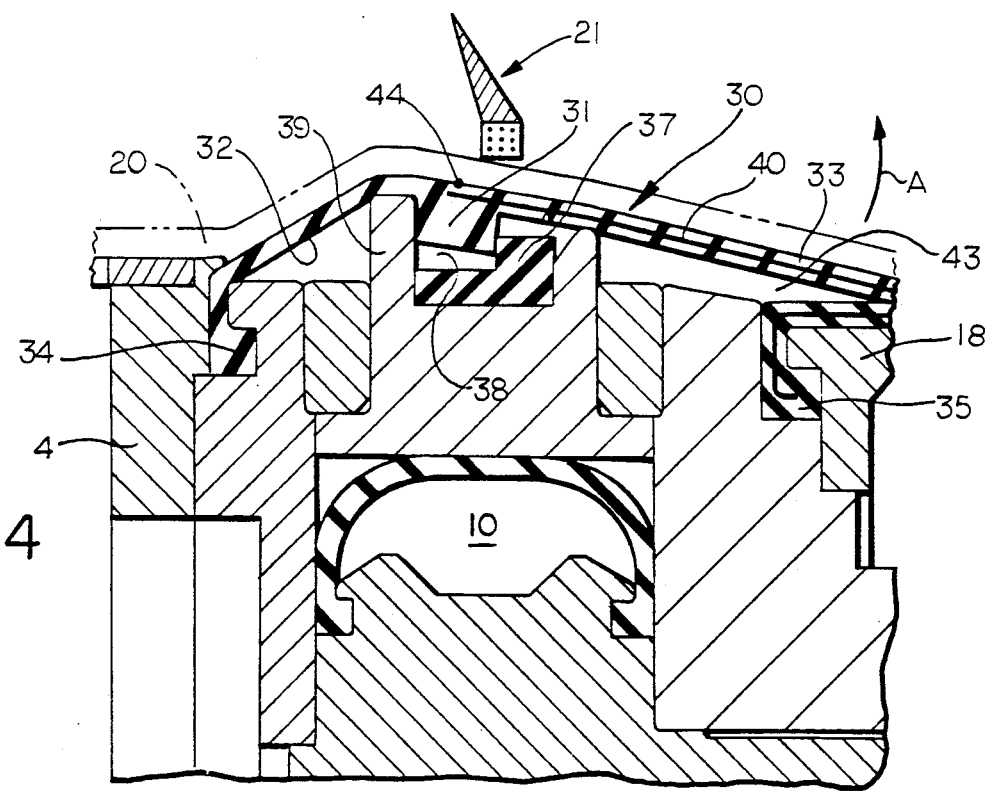
FIG. 4 is a view similar to FIG. 3 showing the bead lock segments in a radially outwardly expanded position just prior to complete contact with the bead ring and inflation of the turn-up bladder.
Figure 7:
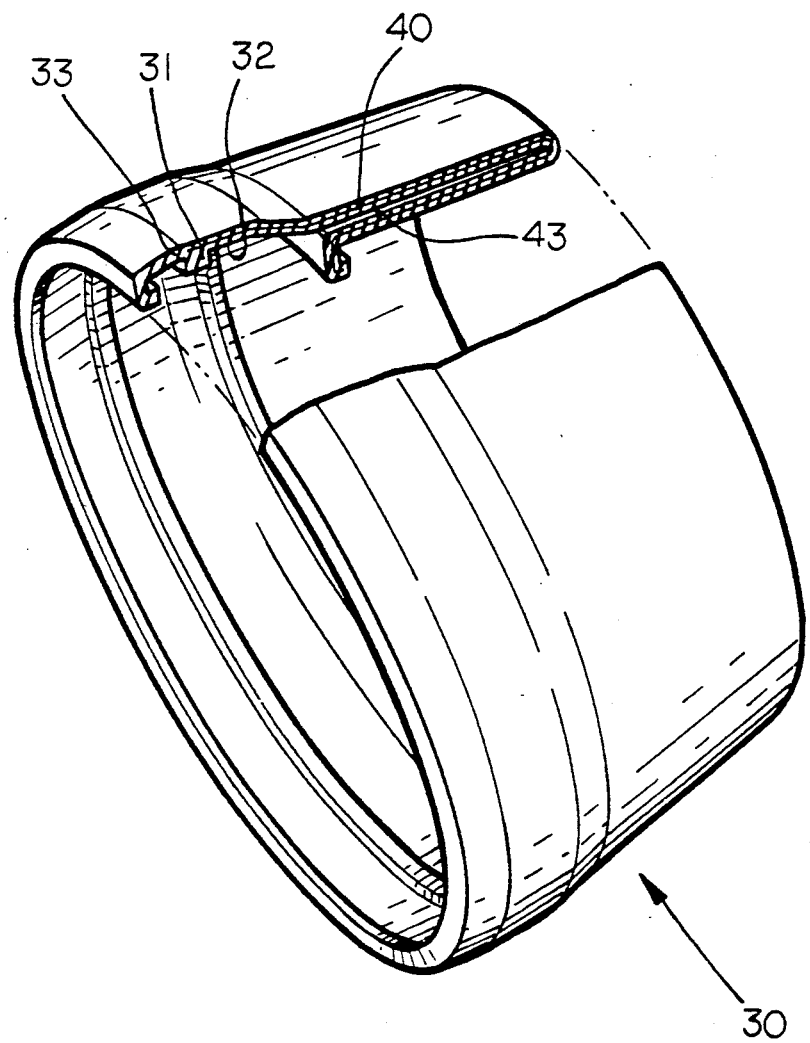
FIG. 7 is a perspective fragmentary view of the improved turn-up bladder of the invention.

FIGS. 3 and 4 show the use of the improved inflatable bladder of the invention, which is indicated generally at 30 and shown particularly in FIG. 7, mounted on the same general type of tire building drum 1 as that shown in FIGS. 1 and 2. In accordance with the invention, a continuous annular rib 31 is formed, on the inside surface 32, of the outer layer of bladder material 33, which in combination with the inner layer of bladder material extends, between ribbed bladder ends 34 and 35 and are folded upon themselves by an outer turned end as shown in FIG. 7. Ends 34 and 35 sealingly mount bladder 30 on drum body 3 by collar plates 4 and 18, as discussed above with respect to bladder ends 5 and 17.

In further accordance with the invention, annular elastomeric return ring 37 is formed with a slot or groove therein. Groove 38 is complementary in shape and size to that of annular rib 31 for receiving and seating rib 31 therein when bead lock segments 9 are expanded radially outwardly as shown in FIG. 4. Groove 38 in return ring 37, preferably is formed in one side thereof, and cooperates with an end portion 39 of bead lock segment 9. However, if desired, groove 38 could be formed entirely within return ring 37 without affecting the concept of the invention.

In further accordance with the invention, internal reinforcing material or cords 40, preferably extend throughout bladder material 33 beginning at rib 31 and continuing into bladder end 35. A stretch zone 41 is formed from rib 31 to the opposite rib end 34 of bladder 30, which is free of any internal reinforcing material. As shown in FIG. 4, it is stretch zone 41 which will stretch as bead lock segments 9 are moved radially outwardly, since bladder end 34 is fixed as well as rib 31, permitting the stretch to occur in this zone or area. This stretch zone prevents any lateral movement of the bladder area above bead lock segments 9 as illustrated by point 44 marked thereon. Thus, this lateral stabilization of the bladder area above bead lock segments 9, will also maintain the tire carcass 20, and in particular the reinforcing material or cords contained therein, also laterally stabilized, preventing the undesirable distortion or movement of these internal reinforcing cords.

The operation of tire drum 1 and inflatable bladder 30 is similar to that with respect to FIGS. 1 and 2. After the radially outward expansion of bead lock segments 9 by the introduction of pressurized air into chamber 10 to bring the tire carcass and bladder into pressure engagement with the coaxially telescopically mounted bead ring 21, pressurized air then fills bladder 30 and the expansion chamber 43 formed between the folds of the bladder. This will cause portions of the bladder to move upwardly to wrap the ends of the carcass about the bead ring. The centerline of the drum is to the left of the bead lock segments as shown in FIGS. 4 and 5, and the bladder will move in the general direction of arrow A (FIG. 4).

Figure 5:
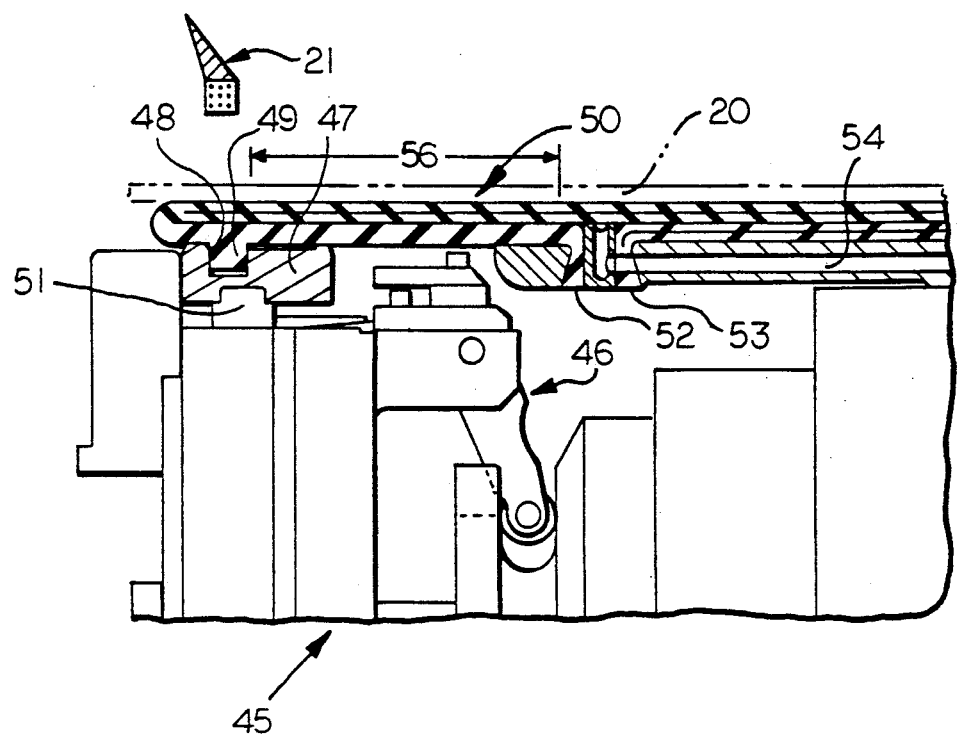
FIG. 5 is a fragmentary generally diagrammatic view in partial section, showing the improved turn-up bladder mounted on a different type of tire building drum, wherein the bead lock segments are mechanically moved, and are shown in retracted position.
Figure 6:
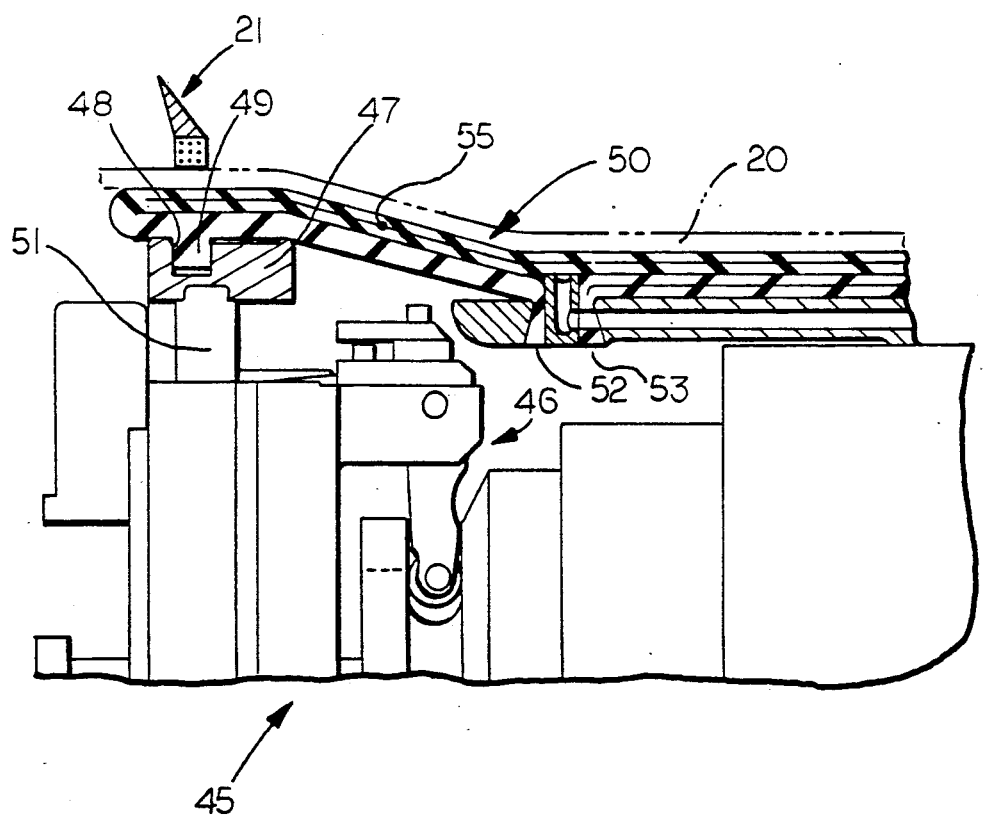
FIG. 6 is a view similar to FIG. 5 with the bead lock segments being mechanically expanded into engagement with the bead ring prior to inflation of the turn-up bladder.

A slightly modified form of the invention is shown in FIGS. 5 and 6 in which a different type of tire building drum 45 is used with a modified bladder 50. Drum 45 utilizes a mechanically actuated linkage indicated generally at 46, for moving bead lock segments 47 radially outwardly toward bead ring 21. In tire building drum 45, bead lock segments 47 preferably are formed of metal without any elastomeric return ring, and are formed with slots or grooves 48 for receiving an annular rib portion 49 of inflatable bladder 50 therein. Segments 47 are moved radially outwardly and inwardly by a member 51 on which segments 47 are mounted, upon movement of the mechanical linkage.

Bladder 50 is generally similar to bladder 30 discussed above, except that annular rib 49 is formed on an outer surface of the bladder and the ribbed bladder end 52 is clamped generally adjacent the other ribbed bladder end 53 axially outboard of rib 49. The centerline of the tire building drum is to the left of FIGS. 5 and 6 as was the location of the centerline of the tire building drum of FIGS. 3 and 4. Pressurized air is moved through an inlet line 54 of tire building drum 45 in a well known manner, for inflating bladder 50. Bladder ends 52 and 53 are sealingly mounted on the tire building drum also in a manner well known in the art.

In further accordance with the invention, a stretch zone 56 is located between rib 49 and bladder end 52 and is free of any internal reinforcing material. The remainder of the bladder preferably has a reinforcing material 55 embedded therein, although the same is not necessary for the successful use of the improved bladder.

The desired results are achieved by modified tire building drum 45 and bladder 50 in the same manner as by tire building drum 1 and bladder 30, since that area of bladder 50 located coaxial with and radially outwardly from bead lock segments 49 is laterally stabilized by the locking of rib 49 within the grooves of segments 47 to prevent any lateral or axial movement of the bladder and overlying tire carcass upon being expanded into engagement with bead ring 21, in combination with stretch zone 56.

Thus, the improved bead turn-up bladder is formed with a stabilizing rib, preferably formed integrally with the bladder and of the same elastomeric material, which enables the rib and that portion of the bladder material adjacent thereto, to be laterally stabilized by locking the annular rib within an annular groove formed by the individual slots of the circularly arranged bead lock segments. Thus outward radial expansion of the bead locks will not laterally displace the bladder and overlying tire carcass, with the only movement of the bladder and carcass occurring in the stretch zone thereof, which is the unreinforced area of the bladder extending between the rib and the adjacent inboard end of the turn-up bladder.

Accordingly, the inflatable bead turn-up bladder is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved inflatable bead turn-up bladder is constructed and used, the characteristics of the construction, and the advantageous, new and useful results obtained; the new and useful structures, devices, elements, arrangements, parts and combinations, are set forth in the appended claims.

I claim:

1. The combination of a tire building drum of the type having a plurality of radially movable bead lock segments circularly arranged coaxially of the drum for gripping a bead of a tire carcass, and an inflatable bead turn-up elastomeric bladder disposed coaxially of the drum and extending generally axially outwardly with respect to a centerline of the drum and with a portion of said bladder coaxially overlying the movable bead lock segments; said bead lock segments being formed with slots providing an annular groove about the circularly arranged segments; said bladder being folded upon itself to provide an outer and an inner layer of material terminating in a pair of ends sealingly secured on the drum and forming an inflatable chamber between said layers; said bladder further having rib means seated in the annular groove formed in the bead lock segments for reducing axial movement of a portion of the outer layer of the bladder lying coaxially adjacent the segments upon radial movement of said segments, said rib means being formed integrally on the outer layer of the bladder and extending radially inwardly therefrom toward the bead lock segments and located axially intermediate the ends of the bladder; said bladder further having a stretch zone in the outer layer generally free of internal reinforcement which lies between the rib means and one of the ends of the bladder, which end is located axially inwardly toward the centerline of the drum, and internal reinforcement being provided in the outer layer of the bladder extending from the rib means toward the other end of the bladder.

2. The combination defined in claim 1 in which the bead lock segments include an annular outer ring of elastomeric material which biases the segments toward a retracted position; and in which the annular groove is formed in said ring of elastomeric material.

3. The combination defined in claim 1 in which the internal reinforcement in the bladder is a plurality of cords which extend from adjacent the rib means to the other end of the bladder.

4. The combination defined in claim 1 in which the stretch zone extends from a midpoint of the rib means to the said one end of the bladder, with said one end being axially inwardly toward the center of the drum from the other of said bladder ends.

* * * * *